(12) United States Patent
Nguyen et al.

(10) Patent No.: US 7,000,047 B2
(45) Date of Patent: Feb. 14, 2006

(54) MECHANISM FOR EFFECTIVELY HANDLING LIVELOCKS IN A SIMULTANEOUS MULTITHREADING PROCESSOR

(75) Inventors: Dung Quoc Nguyen, Austin, TX (US); Raymond Cheung Yeung, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 10/422,036

(22) Filed: Apr. 23, 2003

(65) Prior Publication Data

US 2004/0215933 A1  Oct. 28, 2004

(51) Int. Cl.
  G06F 12/00   (2006.01)
  G06F 12/14   (2006.01)
  G06F 15/16   (2006.01)
  G06F 9/46    (2006.01)

(52) U.S. Cl. ............... 710/200; 718/103; 718/108; 709/248

(58) Field of Classification Search ........... 710/200; 718/103, 108; 709/248
  See application file for complete search history.

(56) References Cited

U.S. PATENT DOCUMENTS

| | | | |
|---|---|---|---|
| 5,369,745 A | 11/1994 | Faber | 395/200 |
| 5,717,876 A | 2/1998 | Robertson | 395/309 |
| 5,734,846 A | 3/1998 | Robertson | 395/273 |
| 5,761,446 A | 6/1998 | Donley et al. | 395/287 |
| 5,778,235 A | 7/1998 | Robertson | 395/728 |
| 6,078,981 A * | 6/2000 | Hill et al. | 710/200 |
| 6,085,215 A | 7/2000 | Ramakrishnan et al. | 709/102 |
| 6,128,640 A * | 10/2000 | Kleinman | 718/102 |
| 6,141,715 A | 10/2000 | Porterfield | 710/113 |
| 6,212,544 B1 * | 4/2001 | Borkenhagen et al. | 718/103 |
| 6,523,076 B1 | 2/2003 | Kruse | 710/119 |
| 6,542,921 B1 * | 4/2003 | Sager | 718/108 |
| 6,567,839 B1 * | 5/2003 | Borkenhagen et al. | 718/103 |
| 6,662,204 B1 * | 12/2003 | Watakabe et al. | 718/107 |
| 6,845,504 B1 * | 1/2005 | Hua et al. | 718/104 |
| 2004/0073905 A1 * | 4/2004 | Emer et al. | 718/101 |

* cited by examiner

*Primary Examiner*—Paul R. Myers
*Assistant Examiner*—Christopher A. Daley
(74) *Attorney, Agent, or Firm*—Robert A. Voight, Jr.; Winstead Sechrest & Minick P.C.; Casimer K. Salys

(57) ABSTRACT

A method and multithreaded processor for handling livelocks in a simultaneous multithreaded processor. A number of instructions for a thread in a queue may be counted. A counter in the queue may be incremented if the number of instructions for the thread in the queue in a previous clock cycle is equal to the number of instructions for the thread in the queue in a current clock cycle. If the value of the counter equals a threshold value, then a livelock condition may be detected. Further, if the value of the counter equals a threshold value, a recovery action may be activated to handle the livelock condition detected. The recovery action may include blocking the instructions associated with a thread causing the livelock condition from being executed thereby ensuring that the locked thread makes forward progress.

26 Claims, 8 Drawing Sheets

MECHANISM FOR EFFECTIVELY HANDLING LIVELOCKS IN A SIMULTANEOUS MULTITHREADING PROCESSOR

TECHNICAL FIELD

The present invention relates to the field of multithreading processors, and more particularly to a mechanism for effectively handling livelocks in a simultaneous multithreading (SMT) processor.

BACKGROUND INFORMATION

Modern processors employed in computer systems use various techniques to improve their performance. One of these techniques is commonly referred to as "multithreading." Multithreading allows multiple streams of instructions, commonly referred to as "threads," to be executed. The threads may be independent programs or related execution streams of a single parallel program or both.

Processors may support three types of multithreading. The first is commonly referred to as "coarse-grained" or "block multithreading." Coarse-grained or block multithreading may refer to rapid switching of threads on long-latency operations. The second is commonly referred to as "fine-grained multithreading." Fine-grained multithreading may refer to rapid switching of the threads on a cycle by cycle basis. The third type of multithreading is commonly referred to as "simultaneous multithreading." Simultaneous multithreading may refer to scheduling of instructions from multiple threads within a single cycle.

In modern processors, including simultaneous multithreading (SMT) processors, a condition commonly referred to as a "livelock" may occur. A livelock in the context of an SMT processor may occur when a thread cannot make forward progress because of a resource being locked. For example, in an SMT processor, instructions for multiple threads may be fetched and decoded. The decoded instructions may be forwarded in an order determined by an algorithm (can be out-of-order) to queues coupled to execution units, e.g., floating point units, fixed point units, load/store units. Each queue may be coupled to a particular execution unit. The queue may issue instructions from multiple threads to an execution unit in a manner where the instruction that has been stored in the queue the longest (referring to the instruction stored at the bottom of the queue) may be first issued to the execution unit. Some of the instructions stored in the queue may be "macroinstructions" that are made up of simple, micro-operations, called "micro-ops." These micro-ops may be stored in separate instructions and hence stored in separate entries in the queue. The execution unit upon executing a first micro-op of a particular macroinstruction for a particular thread, e.g., thread $T_0$, may expect to receive the following micro-op for that particular macroinstruction to be executed. If the execution unit does not receive the expected instruction from the issue queue, the execution unit may transmit an indication to that queue that the instruction was rejected and to reissue that instruction at a later point in time. The queue may then store the rejected instruction in the entry in which it was previously located. The queue may subsequently issue the following stored instructions which may include instructions of another thread, e.g., thread $T_1$, in a designated number of cycles and then reissue the rejected instruction(s). Since the queue is limited in the number of cycles during which it may issue subsequently stored instructions, the queue may not issue the particular instruction the execution unit is expecting. That is, the queue may start to reissue rejected instructions prior to issuing instructions located in entries towards the top of the queue. If the instruction the execution unit is expecting is located in one of these top entries, then the execution unit may never receive the expected instruction. Consequently, the execution unit may continually reject the received instructions which may include instructions of another thread, e.g., thread $T_1$, and the queue may continually reload and later reissue these rejected instructions. Hence, the other thread, e.g., thread $T_1$, may be unable to make forward progress. This condition may be referred to as "livelock."

The current techniques for detecting livelock conditions usually involve a counter counting the number of cycles from the last instruction executed. If the number exceeds a threshold, then a livelock condition may be assumed. Typically, the threshold is extremely high, such as on the order of a million cycles, to ensure that a livelock condition is not incorrectly identified such as identifying the fetching of an instruction from memory after a cache miss as a livelock condition. Further, the current recovery methods for a livelock condition usually involve a flush of the stored instructions and to refetch the instruction causing the livelock condition. These techniques for detecting livelock conditions are too slow. Further, flushing of instructions should be avoided if at all possible.

Therefore, there is a need in the art to effectively handling livelocks in a simultaneous multithreading (SMT) processor by detecting livelock conditions earlier than current detection techniques and avoiding the flushing of instructions in a recovery action.

SUMMARY

The problems outlined above may at least in part be solved in some embodiments by counting the number of instructions per thread in a queue for each clock cycle. A counter may be used to track the number of consecutive clock cycles the number of instructions for a particular thread has not changed in the queue. If the value in the counter exceeds a threshold, a livelock condition may be detected. Upon detecting a livelock condition, the thread causing the livelock condition may be blocked from being executed in a recovery action. That is, upon detecting a livelock condition, the instructions associated with the thread causing the livelock condition may be blocked from being executed. Each instruction in the queue may comprise a bit, referred to herein as the "block bit," that may indicate whether this particular instruction should not be issued, i.e., blocked from issuance. Upon detecting a livelock condition, the block bit may be set for each of the instructions of the thread to be blocked to thereby ensure that the locked thread makes forward progress.

In one embodiment of the present invention, a method for handling livelocks in a simultaneous multithreading processor may comprise the step of counting a number of instructions for a thread in a queue. The method may further comprise incrementing a counter in the queue if the number of instructions for the thread in the queue in a previous clock cycle is equal to the number of instructions for the thread in the queue in the current clock cycle. If the value of the counter equals a threshold value, then a recovery action is activated.

In another embodiment of the present invention, a method for handling livelocks in a simultaneous multithreading processor may comprise the step of counting a number of instructions for a plurality of threads in a queue. The method may further comprise incrementing a counter if the number of instructions for each of the plurality of threads in the queue did not all change from a previous clock cycle with respect to a current clock cycle. If the value of the counter equals a threshold value, then a recovery action is activated.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
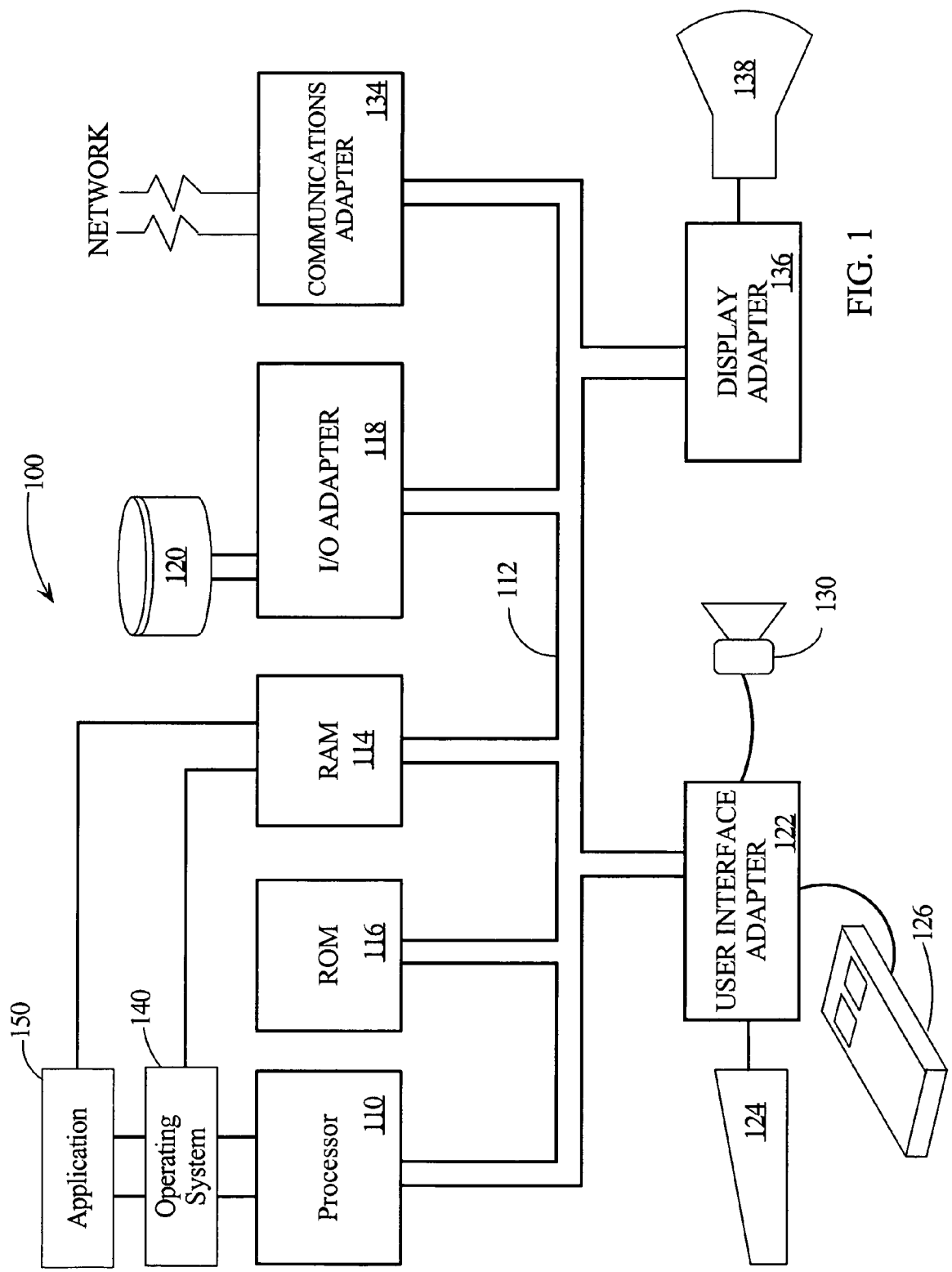
FIG. 1 illustrates an embodiment of the present invention of a computer system.

The present invention comprises a method and multithreaded processor for handling livelocks in a simultaneous multithreaded processor. In one embodiment of the present invention, a number of instructions for a thread in a queue may be counted. A counter in the queue may be incremented if the number of instructions for the thread in the queue in a previous clock cycle is equal to the number of instructions for the thread in the queue in the current clock cycle. If the value of the counter equals a threshold value, then a livelock condition may be detected. Further, if the value of the counter equals a threshold value, then a recovery action may be activated to handle the livelock condition detected. In another embodiment of the present invention, a number of instructions for a plurality of threads in a queue may be counted. A counter in the queue may be incremented if the number of instructions for each of the plurality of threads in the queue did not all change from a previous clock cycle with respect to a current clock cycle. If the value of the counter equals a threshold value, then a livelock condition may be detected. Further, if the value of the counter equals a threshold value, then a recovery action may be activated to handle the livelock condition detected. In one embodiment, the recovery action may include blocking the instructions associated with a thread causing the livelock condition from being executed. Each instruction in the queue may comprise a bit, referred to herein as the "block bit," that may indicate whether or not this particular instruction should not be issued, i.e., blocked from issuance. Upon detecting a livelock condition, the block bit may be set for each of the instructions of the thread to be blocked to thereby ensure that the locked thread makes forward progress.

Although the present invention is described with reference to detecting a livelock condition, it is noted that the principles of the present invention may be applied to deadlock conditions. It is yet further noted that a person of ordinary skill in the art would be capable of applying the principles of the present invention as discussed herein to deadlock conditions. Embodiments applying the principles of the present invention to deadlock conditions would fall within the scope of the present invention.

In the following description, numerous specific details are set forth to provide a thorough understanding of the present invention. However, it will be apparent to those skilled in the art that the present invention may be practiced without such specific details. In other instances, well-known circuits may be shown in block diagram form in order not to obscure the present invention in unnecessary detail. For the most part, details considering timing, data formats within communication protocols, and the like have been admitted inasmuch as such details are not necessary to obtain a complete understanding of the present invention and are within the skills of persons of ordinary skill in the relevant art.

FIG. 1—Computer System

FIG. 1 illustrates a hardware configuration of computer system 100 which is representative of a hardware environment for practicing the present invention. Computer system 100 may have a processing unit 110 coupled to various other components by system bus 112. Processing unit 110 may be a simultaneous multithreading processor as described in detail below in conjunction with FIG. 2. An operating system 140 may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. It should be noted that software components including operating system 140 and application 150 may be loaded into RAM 114, which may be computer system's 100 main memory for execution. Disk adapter 118 may be an integrated drive electronics ("IDE") adapter that communicates with a disk unit 120, e.g., a disk drive.

Computer system 100 may further comprise a communications adapter 134 coupled to bus 112. Communications adapter 134 may interconnect bus 112 with an outside network enabling computer system 100 to communicate with other such systems. I/O devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138.

Figure 2:
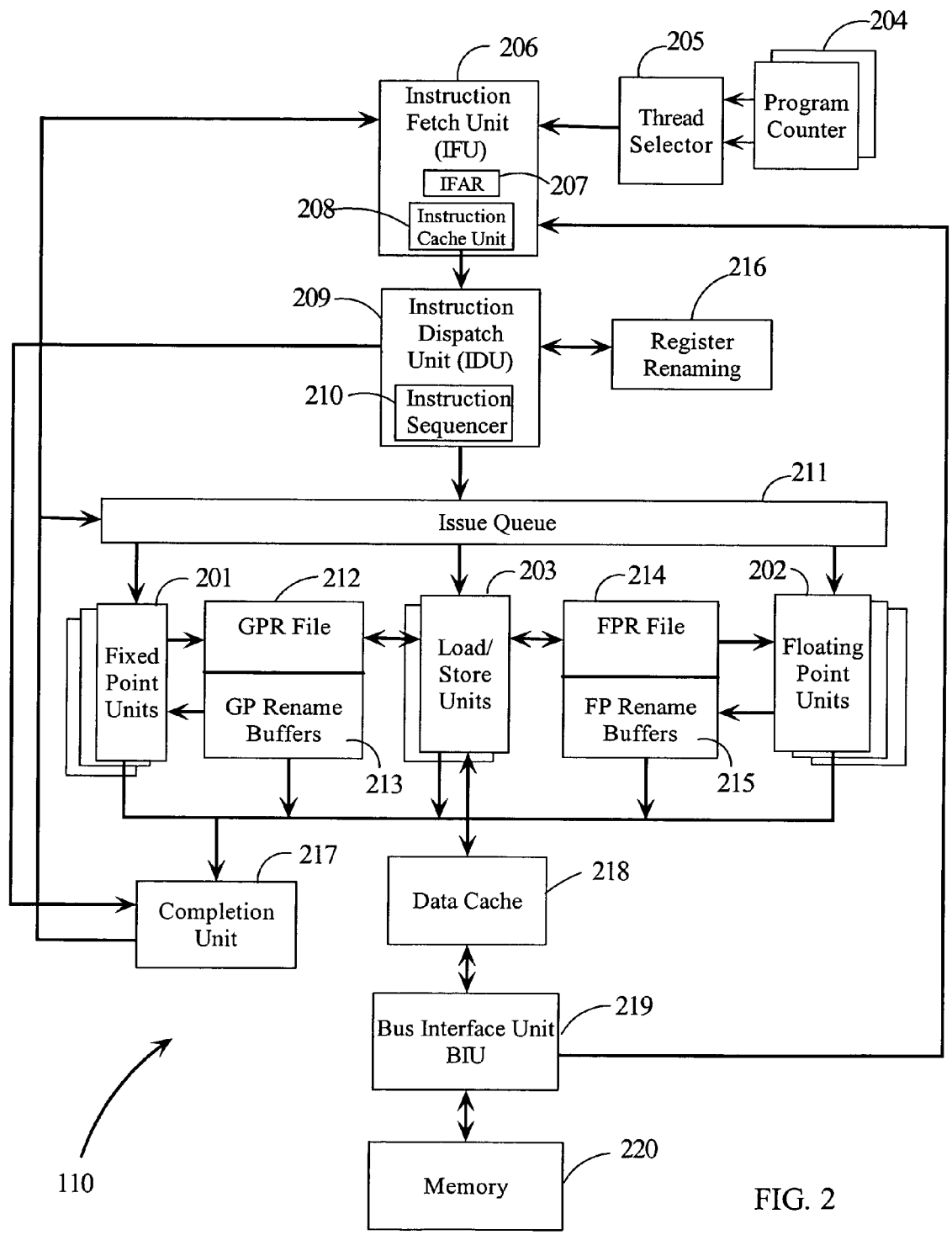
FIG. 2 illustrates an embodiment of the present invention of a simultaneous multithreading processor.

FIG. 2—Simultaneous Multithreading Processor

FIG. 2 illustrates an embodiment of a simultaneous multithreading processor 110. Multithreading processor 110 may be configured to execute multiple instructions per clock cycle. Further, processor 110 may be configured to simultaneous execute instructions from multiple threads as discussed further below. These instructions may be executed in any of the execution units of processor 110 including Fixed Point Units (FXUs) 201, Floating Point Units (FPUs) 202 and Load/Store Units (LSUs) 203 during any one clock cycle. It is noted that processor 110 may comprise other execution units, such as branch execution units, and that processor 110 is not limited in scope to any one particular embodiment. It is further noted that processor 110 may include additional units, registers, buffers, memories, and other sections than illustrated in FIG. 2. It is further noted that some of the elements described below such as issue queues 211, FXUs 201, FPUs 202, LSUs 203, may be referred to either collectively or individually, e.g., FXUs 201, FXU 201. It is further noted that although processor 110 is described below as executing instructions from two threads that processor 110 may be configured to execute instructions from any number of threads.

Processor 110 may comprise Program Counters (PCs) 204 that correspond to multiple threads, e.g., thread one, thread two, which have instructions for execution. A thread selector 205 may toggle on each clock cycle to select which thread to be executed. Upon selection of a particular thread, an Instruction Fetch Unit (IFU) 206 may be configured to load the address of an instruction from PCs 204 into Instruction Fetch Address Register 207. The address received from PCs 204 may be an effective address representing an address from the program or compiler. The instruction corresponding to the received effective address may be accessed from Instruction Cache (I-Cache) unit 208 comprising an instruction cache (not shown) and a prefetch buffer (not shown). The instruction cache and prefetch buffer may both be configured to store instructions. Instructions may be inputted to instruction cache and prefetch buffer from a system memory 220 through a Bus Interface Unit (BIU) 219.

Instructions from I-Cache unit 208 may be outputted to Instruction Dispatch Unit (IDU) 209. IDU 209 may be configured to decode these received instructions. At this stage, the received instructions are primarily alternating from one thread to another. IDU 209 may further comprise an instruction sequencer 210 configured to forward the decoded instructions in an order determined by various algorithms. The out-of-order instructions may be forwarded to one of a plurality of issue queues 211 where a particular issue queue 211 may be coupled to one or more particular execution units, fixed point units 201, load/store units 203 and floating point units 202. Each execution unit may execute one or more instructions of a particular class of instructions. For example, FXUs 201 may execute fixed point mathematical and logic operations on source operands, such as adding, subtracting, ANDing, ORing and XORing. FPUs 202 may execute floating point operations on source operands, such as floating point multiplication and division. FXUs 201 may input their source and operand information from General Purpose Register (GPR) file 212 and output their results (destination operand information) of their operations for storage at selected entries in General Purpose rename buffers 213. Similarly, FPUs 202 may input their source and operand information from Floating Point Register (FPR) file 214 and output their results (destination operand information) of their operations for storage at selected entries in Floating Point (FP) rename buffers 215.

Processor 110 may dynamically share processor resources, such as execution units, among multiple threads by renaming and mapping unused registers to be available for executing an instruction. This may be accomplished by register renaming unit 216 coupled to IDU 209. Register renaming unit 216 may be configured to determine the registers from the register file, e.g., GPR file 212, FPR file 214, that will be used for temporarily storing values indicated in the instructions decoded by IDU 209.

As stated above, instructions may be queued in one of a plurality of issue queues 211. If an instruction contains a fixed point operation, then that instruction may be issued by an issue queue 211 to any of the multiple FXUs 201 to execute that instruction. Further, if an instruction contains a floating point operation, then that instruction may be issued by an issue queue 211 to any of the multiple FPUs 202 to execute that instruction.

All of the execution units, FXUs 201, FPUs 202, LSUs 203, may be coupled to completion unit 217. Upon executing the received instruction, the execution units, FXUs 201, FPUs 202, LSUs 203, may transmit an indication to completion unit 217 indicating the execution of the received instruction. This information may be stored in a table (not shown) which may then be forwarded to IFU 206. Completion unit 217 may further be coupled to IDU 209. IDU 209 may be configured to transmit to completion unit 217 the status information, e.g., type of instruction, associated thread, of the instructions being dispatched to issue queues 211. Completion unit 217 may further be configured to track the status of these instructions. For example, completion unit 217 may keep track of when these instructions have been "completed." An instruction may be said to be "completed" when it has executed and is at a stage where any exception will not cause the reissuance of this instruction. Completion unit 217 may further be coupled to issue queues 211 and further configured to transmit an indication of an instruction being completed to the appropriate issue queue 211 that issued the instruction that was completed.

LSUs 203 may be coupled to a data cache 218. In response to a load instruction, LSU 203 inputs information from data cache 218 and copies such information to selected ones of rename buffers 213, 215. If such information is not stored in data cache 218, then data cache 218 inputs through Bus Interface Unit (BIU) 219 such information from a system memory 220 connected to system bus 112 (see FIG. 1). Moreover, data cache 218 may be able to output through BIU 219 and system bus 112 information from data cache 218 to system memory 220 connected to system bus 112. In response to a store instruction, LSU 203 may input information from a selected one of GPR 212 and FPR 214 and copies such information to data cache 218.

It is noted that processor 110 may comprise any number of execution units, e.g., FXUs 201, FPUs 202, LSUs 203, any number of issue queues 211, program counters 201 representing threads, GPRs 212 and FPRs 214, and that processor 110 is not to be confined in scope to any one particular embodiment.

Figure 3:
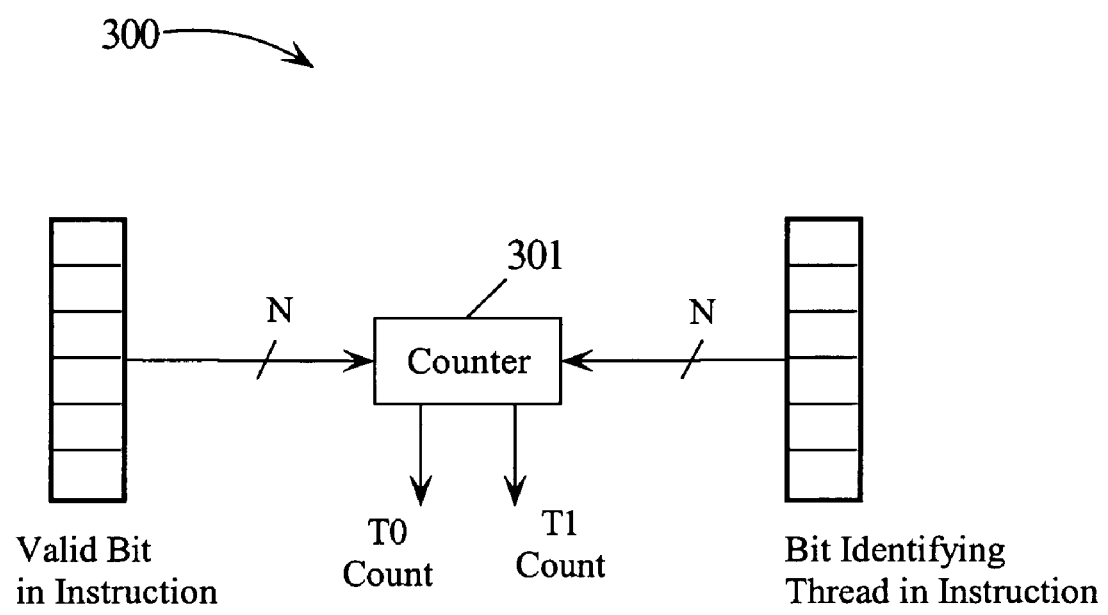
FIG. 3 illustrates an embodiment of the present invention of a counting mechanism in an issue queue.
Figure 4:
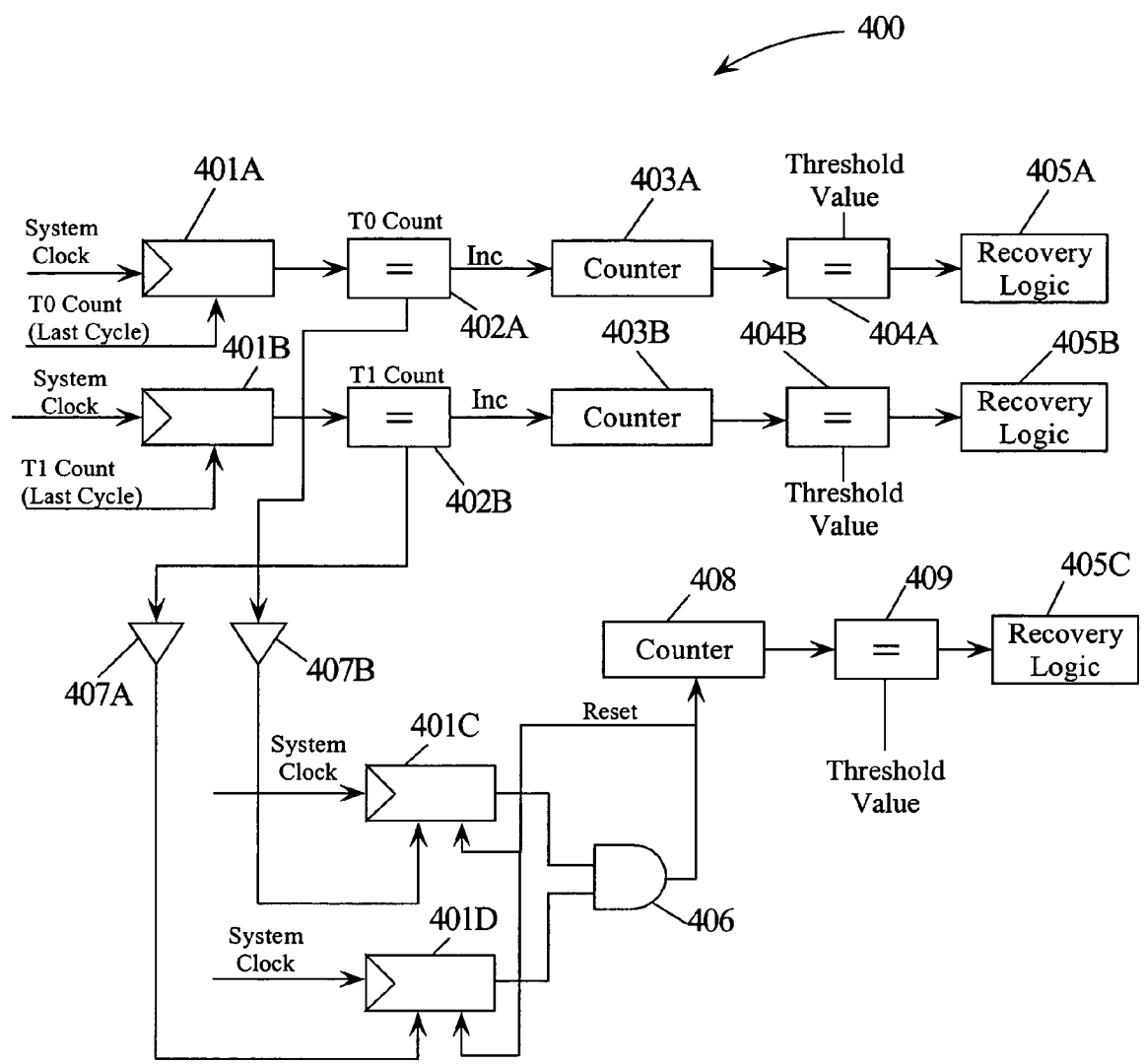
FIG. 4 illustrates an embodiment of the present invention of a mechanism in the issue queue for detecting a livelock condition.
Figure 5:
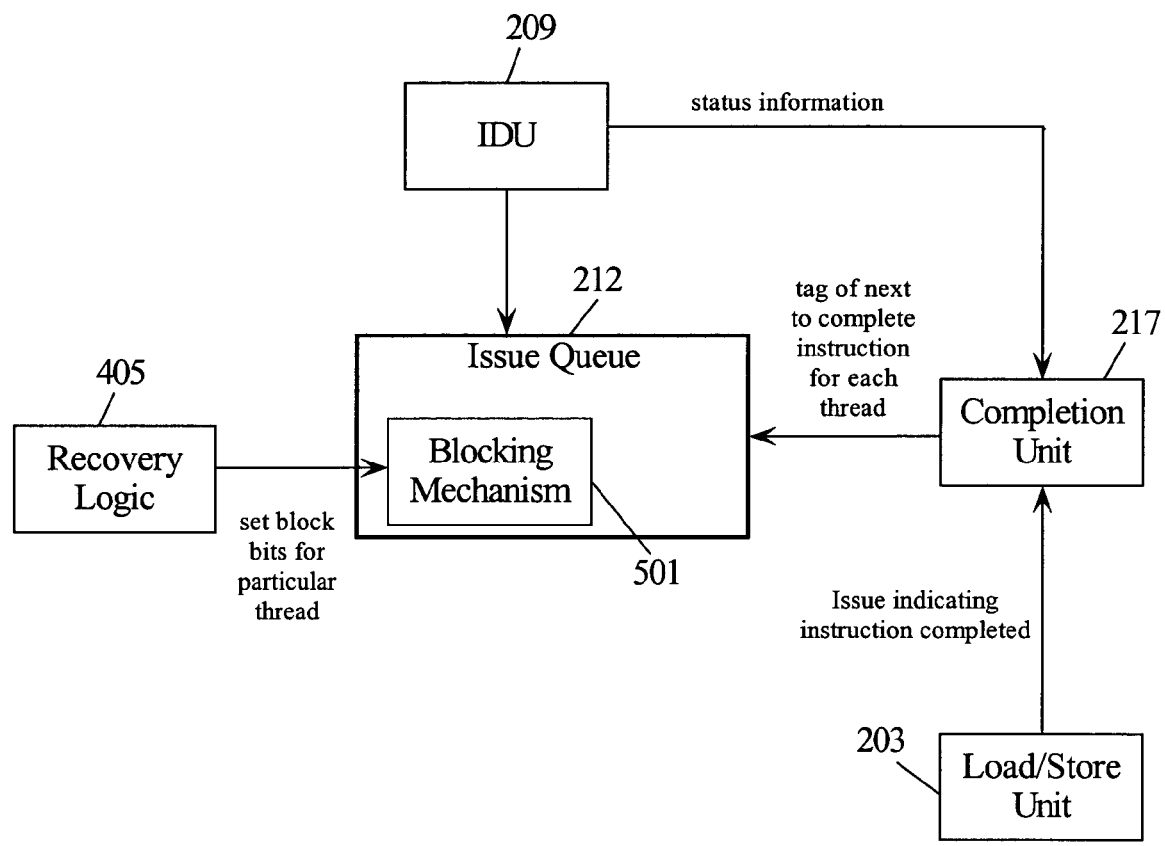
FIG. 5 illustrates an embodiment of the present invention of a mechanism in the issue queue for implementing a recovery action.
Figure 6:
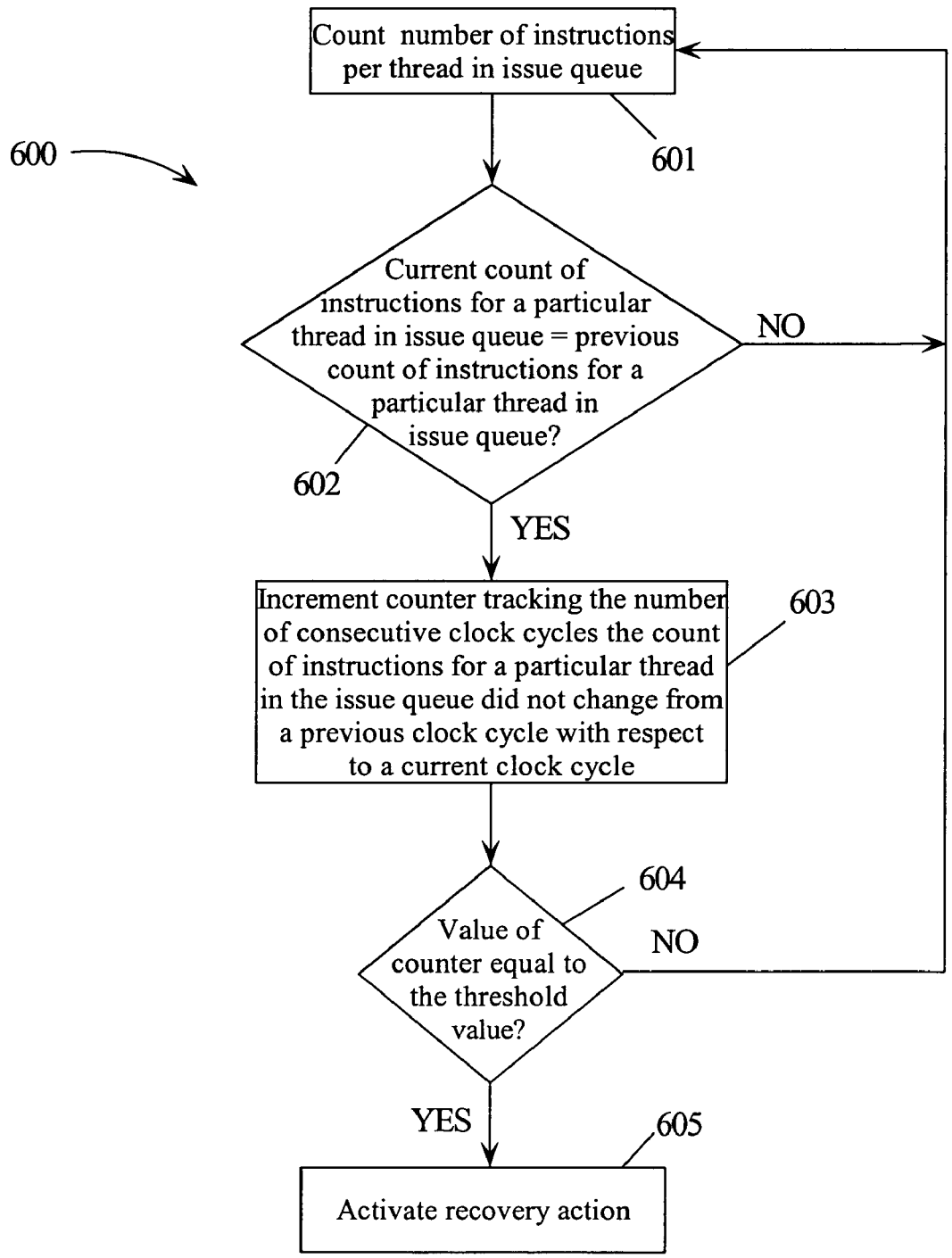
FIG. 6 is a flowchart of a method for detecting a livelock condition in accordance with an embodiment of the present invention.
Figure 7:
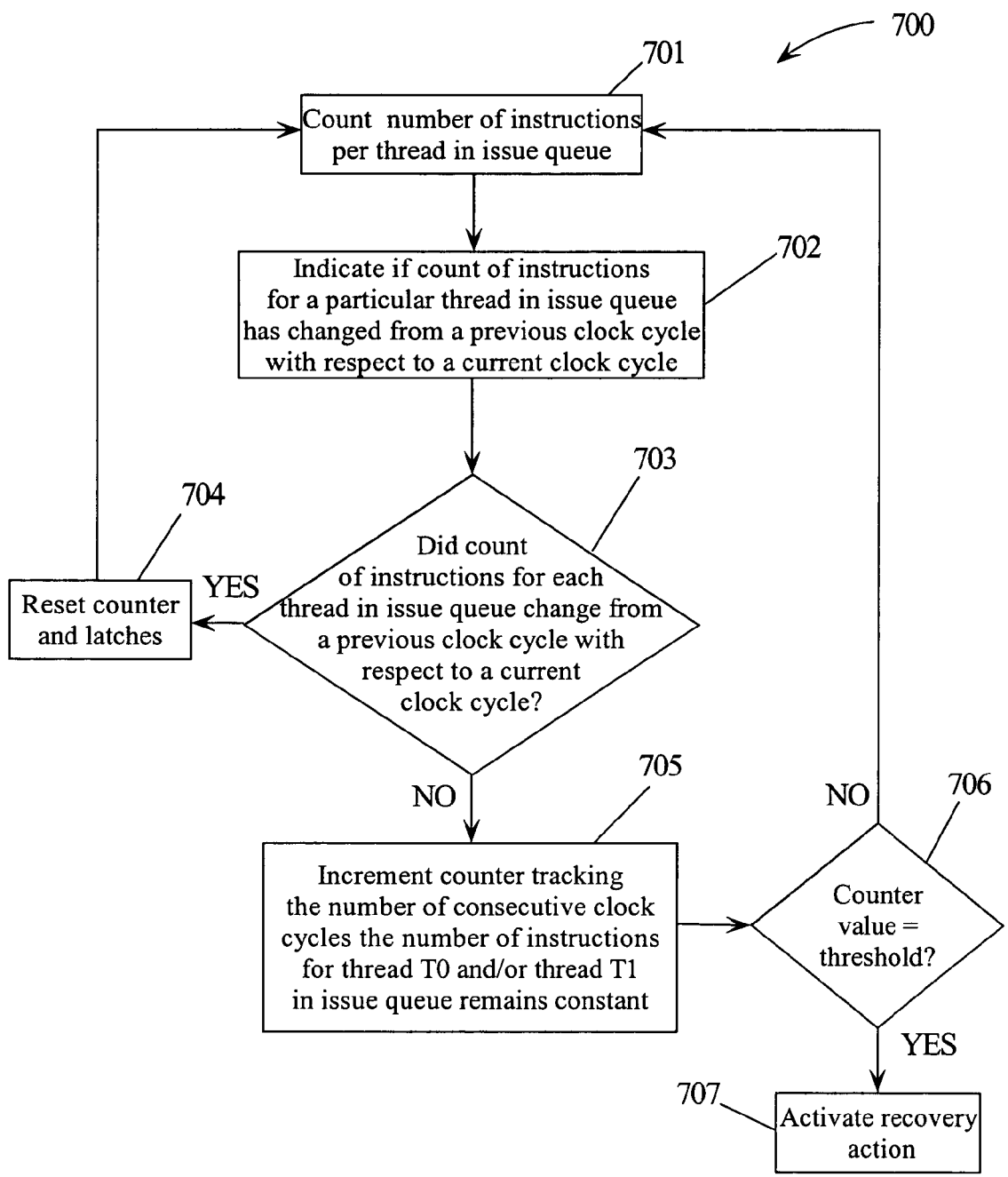
FIG. 7 is a flowchart of a method for detecting a livelock condition in accordance with another embodiment of the present invention.
Figure 8:
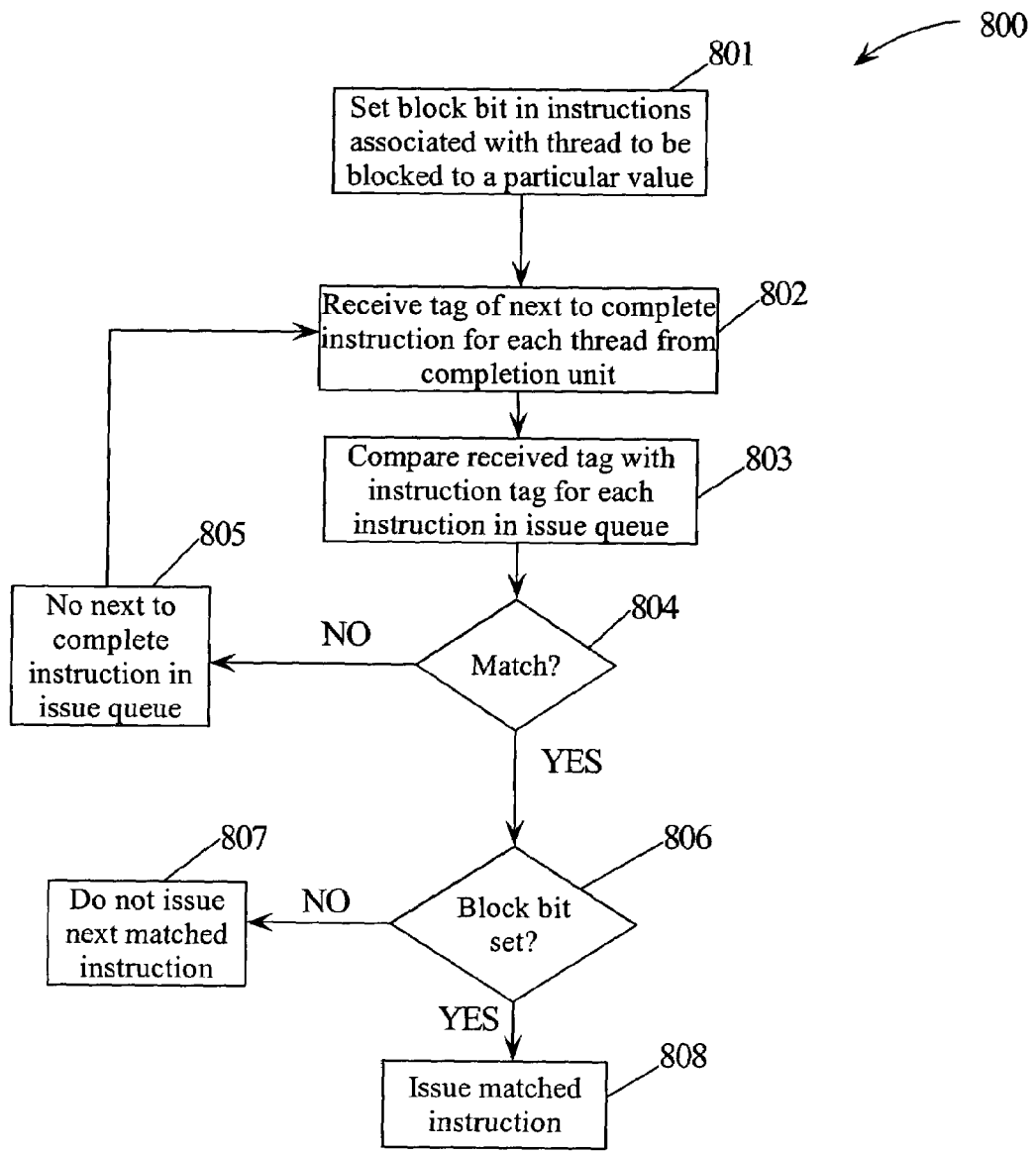
FIG. 8 is a flowchart of a method for implementing a recovery action in accordance with an embodiment of the present invention.

As stated in the Background Information section, the current techniques for detecting livelock conditions usually involve a counter counting the number of cycles from the last instruction executed. If the number exceeds a threshold, then a livelock condition may be assumed. Typically, the threshold is extremely high, such as on the order of a million cycles, to ensure that a livelock condition is not incorrectly identified such as identifying the fetching of an instruction from memory after a cache miss as a livelock condition. Further, the current recovery methods for a livelock condition usually involve a flush of the stored instructions and to refetch the instruction causing the livelock condition. These techniques for detecting livelock conditions are too slow. Further, flushing of instructions should be avoided if at all possible. Therefore, there is a need in the art to effectively handling livelocks in a simultaneous multithreading (SMT) processor by detecting livelock conditions earlier than current detection techniques and avoiding the flushing of instructions in a recovery action. FIGS. 3–4 illustrate a mechanism in issue queue 211 for detecting livelock conditions earlier than current detection techniques. FIG. 5 illustrates a mechanism in issue queue 211 for avoiding the flushing of instructions in a recovery action. FIGS. 6–7 are flowcharts describing the method for handling livelocks in a simultaneous multithreading processor using the mechanism described in FIGS. 3–4. FIG. 8 is a flowchart describing the method for implementing a recovery action using the mechanism described in FIG. 5.

FIG. 3—Counter to Count Number of Instructions Per Thread in Issue Queue

FIG. 3 illustrates an embodiment of the present invention of a mechanism 300 in issue queue 211 for counting the number of instructions per thread in an issue queue 211 (see FIG. 2). It is noted that mechanism 300 described below may be used to count the number of instructions per thread for any particular issue queue 211.

A counter 301 in issue queue 211 may be configured to count the number of instructions per thread in issue queue 211. Each instruction stored in issue queue 211 may include a bit indicating if the instruction is a valid instruction. Further, each instruction stored in issue queue 211 may include a bit identifying a particular thread, e.g., Thread 0 ($T_o$), Thread 1 ($T_1$), the instruction is associated with. In one embodiment, counter 301 may be configured to count the number of valid instructions per thread in issue queue 211 based on the values in these particular bits in the instructions in issue queue 211. Counter 301 may further be configured to issue the count of instructions in issue queue 211 per thread (thread $T_o$ and thread $T_1$) to the mechanism described in FIG. 4 for detecting a livelock condition. It is noted that counter 301 may be configured to count the number of instructions in issue queue 211 for any number of threads and that counting the number of instructions in issue queue 211 for threads $T_o$ and $T_1$ is illustrative.

FIG. 4—Mechanism for Detecting a Livelock Condition

FIG. 4 illustrates an embodiment of a mechanism 400 in issue queue 211 (see FIG. 2) for detecting a livelock condition. Mechanism 400 may comprise a latch 401A–B configured to store the count of the number of instructions per thread in the last clock cycle. For example, latch 401A may be configured to store the number of instructions for Thread $T_0$ in issue queue 211 during the last clock cycle. Latch 401B may be configured to store the number of instructions for Thread $T_1$ in issue queue 211 during the last clock cycle. Latches 401A–B may collectively or individually be referred to as latches 401 or latch 401, respectively. Each latch 401 may receive as inputs a system clock signal generated from processor 110 and the number of instructions for particular thread in issue queue 211 in the previous clock cycle.

Latches 401A–B may be coupled to a comparators 402A–B, respectively. Comparators 402A–B may collectively or individually be referred to as comparators 402 or comparator 402, respectively. Comparator 402 may compare the number of instructions per thread in issue queue 211 in the last clock cycle with the number of instructions per thread in issue queue 211 in the current clock cycle received from counter 301 (see FIG. 3). For example, comparator 402A compares the number of instructions for Thread $T_0$ in issue queue 211 in the current cycle which it receives from counter 301 with the number of instructions for Thread $T_0$ in issue queue 211 in the previous clock cycle which it receives from latch 401A. Similarly, comparator 402B compares the number of instructions for Thread $T_1$ in issue queue 211 in the current cycle which it receives from counter 301 with the number of instructions for Thread $T_1$ in issue queue 211 in the previous clock cycle which it receives from latch 401B. If the number of instructions per thread in the last clock cycle in issue queue 211 equals the number of instructions per thread in issue queue 211 in the current clock cycle, then comparator 402A–B outputs a signal, e.g., a logical value of "1", to counter 403A–B, respectively, to increment the value stored in counter 403A–B, respectively. Counters 403A–B may collectively or individually be referred to as counters 403 or counter 403, respectively. In this manner, the number of consecutive clock cycles the number of instructions per thread in issue queue 211 remains constant may be tracked by counter 403. For example, counter 403A keeps track of the number of consecutive cock cycles the number of instructions for thread $T_0$ in issue queue 211 remains constant. Counter 403B keeps track of the number of consecutive cock cycles the number of instructions for thread $T_1$ in issue queue 211 remains constant.

The value stored in counter 403A–B may be compared with a threshold value, e.g., ten thousand, that may be significantly lower than in prior art by comparator 404A–B, respectively. Comparators 404A–B may collectively or individually be referred to as comparators 404 or comparator 404, respectively. If the value stored in counter 404 equals the threshold value, then comparator 404A–B may output a signal, e.g., a logical value of "1", to activate recovery logic units 405A–B, respectively, to implement a recovery action as discussed in conjunction with FIGS. 5 and 8. Recovery logic units 405A–B may collectively or individually be referred to as recovery logic units 405 or recovery logic unit 405, respectively. In this manner, if counter 403 indicates that the count of the number of times that the number of instructions for a particular thread in issue queue 211 remained constant exceeds a threshold value, then it may be assumed that a livelock condition has occurred. That is, if counter 403 indicates that the number of times that the number of instructions for a particular thread in issue queue 211 remained constant exceeds a threshold value, then it may be assumed that a resource is locked thereby preventing a thread from making forward progress. For example, if the value stored in counter 403A is equal to the threshold value, then it may be assumed that thread $T_0$ is locked or prevented from using a resource, e.g., execution unit. If the value stored in counter 403B is equal to the threshold value, then it may be assumed that thread $T_1$ is locked or prevented from using a resource, e.g., execution unit.

Mechanism 400 may implement another structure for detecting a livelock condition. Mechanism 400 may further comprise latches 401C–D. Latches 401C–D may store a value indicating if the number of instructions for thread $T_0$, $T_1$, respectively, in issue queue 211 has changed from the previous clock cycle. Latches 401C–D may be configured to receive as inputs a system clock signal and the output of comparator 402A–B, respectively. If comparator 402A–B indicates that the number of instructions per thread in issue queue 211 in the current clock cycle is the same as in the previous clock cycle, then comparator 402A–B may output a logic value of "1". The output of comparator 402A–B may be inverted by inverters 407A–B, respectively. Hence, latches 401C–D may consequently store the inversion of the output value of comparator 402A–B, respectively, at the rising or falling clock edge of the system clock signal.

The outputs of latches 401C–D may be inputted to an AND gate 406. The output of AND gate 406 may be a reset line that resets counter 408 and latches 401C–D if the output of AND gate 406 is equal to the logical value of "1". If the output of AND gate is the value of "0", then the value in counter 408 is incremented in that clock cycle. The output of AND gate 406 is the logical value of "0" unless both comparators 402A–B indicate a change in the number of instructions per thread in issue queue 211 for threads $T_0$ and $T_1$, respectively, from the previous clock cycle with respect to the current clock cycle. In this manner, the number of consecutive clock cycles the number of instructions per thread in issue queue 211 remains constant for thread $T_0$ and/or thread $T_1$ may be tracked by counter 408.

When both comparators 402A–B indicate a change in the number of instructions per thread in issue queue 211 for threads $T_0$ and $T_1$, respectively, comparators 402A–B may output a "0". The output of comparators 402A–B are inverted by inverters 407A–B, respectively, which is then inputted latches 401C–D, respectively. Hence, latches 401C–D store a logical value of "1" when both comparators 402A–B indicate a change in the number of instructions per thread in issue queue 211 for threads $T_0$ and $T_1$, respectively. When the outputs of both latches 401C–D are equal to the logical value of "1", the output of AND gate 406 is equal to the logical value of "1". When AND gate 406 outputs a logical value of "1", the reset line resets the value in counter 408 and the value in latches 401C–D to the value of "0".

As stated above, counter 408 may track the number of consecutive clock cycles the number of instructions for thread $T_0$ and/or thread $T_1$ in issue queue 211 remains constant. The value stored in counter 408 may be compared with a threshold value, e.g., ten thousand, by comparator 409. If the value stored in counter 408 equals the threshold value, then comparator 409 may output a signal, e.g., a logical value of "1", to activate recovery logic units 405C to implement a recovery action as discussed in conjunction with FIGS. 5 and 8. It is noted that recovery logic unit 405C may be configured similarly to recovery logic units 405A–B and that recovery logic units 405A–C may collectively or individually be referred to as recovery logic units 405 or recovery logic unit 405, respectively. In this manner, if the value stored in counter 408 is equal to the threshold value, then it may be assumed that a resource is locked thereby preventing both threads, e.g., threads $T_0$ and $T_1$, from making forward progress. That is, if the value stored in counter 408 is equal to the threshold value, then it may be assumed that both threads, e.g., threads $T_0$ and $T_1$, are locked or prevented from using a resource, e.g., execution unit.

It is noted that mechanism 400 may comprise other circuitry than illustrated to perform the functions described above and that such embodiments would fall within the scope of the present invention. It is further noted that each of latches 401A–D may be configured similarly. It is further noted that each of counters 402A–B, 403A–B and 408 may be configured similarly. It is further noted that comparators 402A–B, 404A–B, 407 and 409 may be configured similarly.

FIG. 5—Mechanism for Implementing a Recovery Action

FIG. 5 illustrates an embodiment of the present invention of a mechanism for implementing a recovery action to be activated by recovery logic unit 405 (FIG. 4). Issue queue 211 (FIG. 2) may comprise a blocking mechanism 501 configured to set a block bit in the instructions in issue queue 211 associated with the thread to be blocked. Each instruction may comprise a bit, called a block bit, that may indicate whether or not this particular instruction should be blocked. The bit may be either active high or active low. The term "setting" the block bit as used herein is to refer to placing the value, e.g., logical value of "1" or "0", in that bit position to indicate to issue queue 211 to not issue this particular instruction. In one embodiment, blocking mechanism 501 may set the block bit in the instructions in issue queue 211 associated with the thread to be blocked in response to an indication from recovery logic unit 405 indicating to set the block bit for all instructions for a particular thread. For example, referring to FIG. 4, if the value stored in counter 403A is equal to the threshold value, then it may be assumed that thread $T_0$ is locked or prevented from using a resource, e.g., execution unit. Consequently, recovery logic unit 405A may issue an indication to blocking mechanism 501 to set the block bit for all instructions for thread $T_1$. Upon setting the block bit for all instructions for thread $T_1$, issue queue 211 is prevented from issuing instructions for thread $T_1$. Further, by setting the block bit for all instructions for thread $T_1$, issue queue 211 will issue only instructions from thread $T_0$ thereby solving the livelock condition.

As stated above, IDU 209 may, in addition to dispatching a decoded instruction to an issue queue 211, transmit status information, e.g., type of instruction, associated thread, to completion unit 217 of the instructions being dispatched to issue queues 211. Completion unit 217 may further be configured to track the status of these instructions. For example, completion unit 217 may keep track of when these instructions have been "completed." An instruction may be said to be "completed" when it has executed and is at a stage where any exception will not cause the reissuance of this instruction. Completion unit 217 may be able to keep track of when these instructions are completed by receiving an indication from execution units, e.g., load/store unit 203, upon the execution of an instruction. Completion unit 217 may further be configured to determine which instruction for each thread is the "next to complete" instruction. The "next to complete instruction" may refer to the oldest outstanding instruction that needs to be completed.

In one embodiment of the present invention, completion unit 217 may further be configured to transmit a tag, e.g., series of bits, for each thread to issue queue 211 to indicate the "next to complete instruction" for each thread. Issue queue 211 may be configured to compare the received tag with particular bits in each instruction (tag bits used to identify an instruction) in issue queue 211. If there is a match, then issue queue 211 may determine whether to issue the "next to complete instruction" for each thread depending on whether the block bit was set. If it is set, then issue queue 211 does not issue the "next to complete instruction." Hence, issue queue 211 will not issue the "next to complete instruction" for the thread to be blocked. Otherwise, issue queue 211 issues the "next to complete instruction" to the appropriate execution unit. In this manner, issue queue 211 may be configured to issue the instruction with the highest priority, i.e., the "next to complete instruction," for the thread to make forward progress.

FIG. 6—Method for Detecting a Livelock Condition

FIG. 6 is a flowchart of one embodiment of the present invention of a method 600 for detecting livelock conditions.

Referring to FIG. 6, in conjunction with FIGS. 2–4, in step 601, the number of instructions per thread, e.g., threads $T_0$, $T_1$, is counted by counter 301 in issue queue 211. In step 602, a determination is made by comparators 402A–B as to whether the previous count of instructions for a particular thread in issue queue 211 is equal to the current count of instructions of a particular thread in issue queue 211. For example, a determination may be made by comparator 402A as to whether the number of instructions for thread $T_0$ in issue queue 211 in the previous clock cycle is equal to the number of instructions for thread $T_0$ in issue queue 211 in the current clock cycle. Similarly, a determination may be made by comparator 402B as to whether the number of instructions for thread $T_1$ in issue queue 211 in the previous clock cycle is equal to the number of instructions for thread $T_1$ in issue queue 211 in the current clock cycle.

If the number of instructions for a particular thread in issue queue 211 in the previous clock cycle does not equal the number of instructions for the particular thread in issue queue 211 in the current clock cycle, then the number of instructions in issue queue 211 for that thread is counted in a subsequent clock cycle in step 601.

However, if the number of instructions for a particular thread in issue queue 211 in the previous clock cycle equals the number of instructions for a particular thread in issue queue 211 in the current clock cycle, then, in step 603, counter 403 tracking the number of consecutive clock cycles the number of instructions per thread in issue queue 211 did not change is incremented. For example, if the number of instructions for thread $T_0$ in issue queue 211 for the previous clock cycle is equal to the number of instructions for thread $T_0$ in the current clock cycle, then counter 403A, that tracks the number of consecutive clock cycles the number of instructions for thread $T_0$ in issue queue 211 did not change, is incremented. Similarly, if the number of instructions for thread $T_1$ in issue queue 211 for the previous clock cycle is equal to the number of instructions for thread $T_1$ in the current clock cycle, then counter 403B, that tracks the number of consecutive clock cycles the number of instructions for thread $T_1$ in issue queue 211 did not change, is incremented.

In step 604, a determination is made if the value of counter 403 is equal to a threshold value, e.g., 1,000. If the value of counter 403 does not equal the threshold value, then the number of instructions in issue queue 211 for a particular thread may be counted in the next clock cycle in step 601. However, if the value of counter 403 equals the threshold value, then, in step 605, a recovery action is activated by recovery logic unit 405. A more detailed description of a recovery action is described in conjunction with FIG. 8. Another method for detecting a livelock condition is described below in conjunction with FIG. 7.

It is noted that method 600 may include other and/or additional steps that, for clarity, are not depicted. It is further noted that method 600 may be executed in a different order presented and that the order presented in the discussion of FIG. 6 is illustrative. It is further noted that certain steps in method 600 may be executed in a substantially simultaneous manner.

FIG. 7—Another Method of Detecting Livelock Conditions

FIG. 7 is a flowchart of another embodiment of the present invention of the method 700 for detecting livelock conditions and implementing a recovery action.

Referring to FIG. 7, in conjunction with FIGS. 2–4, in step 701, the number of instructions per thread, e.g., threads $T_0$, $T_1$, is counted by counter 301 in issue queue 211. In step 702, an indication is made as to whether the number of instructions per thread has changed. Referring to FIG. 4, comparators 402A–B determine whether the number of instructions per thread in issue queue 211 has changed from the previous clock cycle with respect to the current clock cycle. For example, comparator 402A compares the number of instructions for thread $T_0$ in issue queue 211 in the previous clock cycle with respect to the current clock cycle. Similarly, comparator 402B compares the number of instructions for thread $T_1$ in issue queue 211 in the previous clock cycle with respect to the current clock cycle. If comparators 402A–B indicate that there is no change in the number of instructions per thread in the previous clock cycle with respect to the current clock cycle, then comparators 402A–B may output a logical value of "1" to latches 401C–D, respectively. If, however, comparators 402A–B determine that the number of instructions per thread in issue queue 211 in the previous clock cycle differs with the current clock cycle, then comparators 402A–B may output a value of "0". The output values of comparators 402A–B are inverted via inverters 407A–B, respectively, which are inputted to latches 401C–D, respectively. Latches 401C–D may be configured to store the inverted output values of comparator 402A–D, respectively.

In step 703, a determination is made as to whether the number of instructions for each thread, e.g., threads $T_0$ and $T_1$, in issue queue 211 changed in the previous clock cycle with respect to the current clock cycle. Referring to FIG. 4, this determination may be made by AND gate 406 ANDing the outputs of latches 401C–D. As stated above, as long as both comparators 402A–B do not indicate that the number of instructions per thread in issue queue 211 has not changed in the previous clock cycle with respect to the current clock cycle, the ANDing of outputs of latches 401C–D will be equal to "0". The output of ANDing the outputs of latches 401C–D will only be equal to the logical value of "1" when both comparators 402A–B indicate that the number of instructions per thread in issue queue 211 has changed from the previous clock cycle with respect to the current clock cycle. When AND gate 406 outputs a logical value of "1", the reset line resets the value in counter 408 and the value in latches 401C–D to the value of "0".

If the number of instructions for each thread, e.g., threads $T_0$ and $T_1$, in issue queue 211 change from the previous clock cycle with respect to the current clock cycle, then, in step 704, counter 408 is reset. As stated above, counter 408 may be configured to track of the number of consecutive clock cycles the number of instructions for thread $T_0$ and/or thread $T_1$ in issue queue 211 remains constant. Further, in step 704, latches 401C–D is reset. As stated above, latches 401C–D may be configured to store the value indicating if the number of instructions for threads $T_0$, $T_1$, respectively, in issue queue 211 has changed from the previous clock cycle with respect to the current clock cycle. Upon resetting counter 408 and latches 401C–D, a number of instructions per thread, e.g., threads $T_0$, $T_1$, is counted by counter 301 for the next clock cycle in step 701.

If, however, the number of instructions for thread $T_0$ and/or $T_1$ in issue queue remains unchanged from the previous clock cycle with respect to the current clock cycle, then, in step 705, counter 408 is incremented.

A determination is made in step 706 as to whether the value of counter 408 equals a threshold value. If the value stored in counter 408 does not equal the threshold value, then a number of instructions per thread, e.g., threads $T_0$, $T_1$, is counted by counter 301 for the next clock cycle in step 701. However, if the value in counter 408 equals the threshold value, then in step 707, a recovery action is activated by recovery logic unit 405. A more detailed description of a method for implementing a recovery action is described below in conjunction with FIG. 8.

It is noted that method 700 may include other and/or additional steps that, for clarity, are not depicted. It is further noted that method 700 may be executed in a different order presented and that the order presented in the discussion of FIG. 7 is illustrative. It is further noted that certain steps in method 700 may be executed in a substantially simultaneous manner.

FIG. 8—Method for Implementing a Recovery Action

FIG. 8 is a flowchart of one embodiment of the present invention of a method 800 for implementing a recovery action.

Referring to FIG. 8, in conjunction with FIGS. 2 and 5 in step 801, a block bit in the instructions in issue queue 211 associated with a thread to be blocked is set to particular value by blocking mechanism 501. In one embodiment, blocking mechanism 501 may set the block bit in instructions in issue queue 211 for a particular thread in response to receiving an indication from recovery logic unit 405 indicating to set the bock bit for all instructions for a particular thread. Each instruction in issue queue 211 may comprise a bit, referred to herein as a "block bit", that may indicate whether or not this particular instruction should be blocked, i.e., indicate whether or not issue queue 211 should issue this particular instruction. The term "setting" the block bit, as used herein, is to refer to placing a value, e.g., logical value of "1" or "0", in that bit position to indicate to issue queue 211 to not issue this particular instruction.

In step 802, issue queue 211 receives a tag, e.g., series of bits, of a "next to complete instruction" for each thread, e.g., threads $T_0$ and $T_1$, from completion unit 217. As stated above, the "next to complete instruction" may refer to the oldest outstanding instruction that needs to be completed. In step 803, issue queue 211 may compare the received tag with the instruction tag (bits used to identify an instruction) for each instruction in issue queue 211.

In step 804, a determination is made by issue queue 211 as to whether there is a match between the received tag and the instruction tag for each instruction in issue queue 211. If there is not a match, then, in step 805, there is no "next to complete instruction" to issue. Issue queue 211 may not be able to find a match between the received tag and the instruction tag for each instruction in issue queue 211 because the "next to complete instruction" may be located in another issue queue 211 or may be located in an execution unit. In one embodiment, issue queue 211 may be configured to wait to receive another tag of the "next to complete instruction" for each thread, e.g., threads $T_0$ and $T_1$, from completion unit 217 in step 802 if there is not a match between the received tag and the instruction tag for each instruction in issue queue 211.

If, however, there is a match between the received tag and an instruction tag for an instruction in issue queue 211, then, in step 806, a determination is made by issue queue 211 as to whether the block bit of the matched instruction is set.

If the block bit is set, then, in step 807, issue queue 211 does not issue the matched instruction. If, however, the block bit is not set, then issue queue 211 issues the "next to complete instruction" in step 808.

It is noted that the recovery action triggered by recovery logic unit 405C involves unlocking both threads. Method 800 may be used to unlock one thread, e.g., thread $T_0$, by setting the block bits of the other thread, e.g., thread $T_1$. Upon issuance of a "next to complete instruction" for the unlocked thread, e.g., thread $T_0$, the unlocked thread may be blocked from issuance by setting the block bits of that thread, e.g., thread $T_0$, thereby unlocking the other thread, e.g., thread $T_1$. In this manner, both threads that were livelocked may make forward progress.

It is further noted that method 800 may include other and/or additional steps that, for clarity, are not depicted. It is further noted that method 800 may be executed in a different order presented and that the order presented in the discussion of FIG. 8 is illustrative. It is further noted that certain steps in method 800 may be executed in a substantially simultaneous manner.

Although the method and multithreaded processor are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for handling livelocks in a simultaneous multithreading processor comprising the steps of:
    counting a number of instructions for a first thread in a queue;
    incrementing a counter in said queue if said number of instructions for said first thread in said queue in a previous clock cycle is equal to said number of instructions for said first thread in said queue in a current clock cycle; and
    activating a recovery action if a value of said counter equals a threshold value.

2. The method as recited in claim 1, wherein said recovery action comprises the step of:
    setting a block bit in instructions associated with a second thread to a predetermined value.

3. The method as recited in claim 2, wherein said instructions with said block bit set to said predetermined value are not issued.

4. The method as recited in claim 2, wherein said recovery action further comprises the steps of:
    receiving a tag of a next to complete instruction for said first and said second thread; and
    comparing said tag with an instruction tag of every instruction in said queue.

5. The method as recited in claim 4, wherein if there is a match of said tag with said instruction tag of an instruction in said queue, then said recovery action further comprises the step of:
    issuing said matched instruction if said matched instruction does not have a block bit set to said predetermined value.

6. The method as recited in claim 5, wherein said matched instruction is said next to complete instruction for said first thread.

7. The method as recited in claim 4, wherein if there is a match of said tag with said instruction tag of an instruction in said queue, then said recovery action further comprises the step of:

not issuing said matched instruction if said matched instruction has a block bit set to said predetermined value.

8. The method as recited in claim 7, wherein said matched instruction is said next to complete instruction for said second thread.

9. The method as recited in claim 4, wherein if there is not a match of said tag of said next to complete instruction for at least one of said first and said second thread with said instruction tag of an instruction in said queue, then said next to complete instruction for at least one of said first and said second thread is not issued.

10. A method for handling livelocks in a simultaneous multithreading processor comprising the steps of:
counting a number of instructions for a plurality of threads in a queue;
incrementing a counter in said queue if said number of instructions for each of said plurality of threads in said queue did not all change from a previous clock cycle with respect to a current clock cycle; and
activating a recovery action if a value of said counter equals a threshold value.

11. The method as recited in claim 10 further comprising the step of:
resetting said counter if said number of instructions for each of said plurality of threads in said queue all change from said previous clock cycle with respect to said current clock cycle.

12. The method as recited in claim 10, wherein said recovery action comprises the step of:
setting a block bit in instructions associated with one of said plurality of threads to a predetermined value.

13. The method as recited in claim 12, wherein said instructions with said block bit set to said predetermined value are not issued.

14. A multithreaded processor, comprising:
an instruction fetch unit configured to access instructions from an instruction cache;
an instruction dispatch unit coupled to said instruction fetch unit, wherein said instruction dispatch unit is configured to decode said fetched instructions; and
a queue coupled to said instruction dispatch unit, wherein said instruction dispatch unit is further configured to dispatch one or more of said decoded instructions to said queue, wherein said queue comprises:
a first counter configured to count a number of instructions for a first thread in said queue;
a second counter coupled to said first counter, wherein said second counter is configured to track a number of consecutive clock cycles a number of instructions for said first thread in said queue did not change from a previous clock cycle with respect to a current clock cycle; and
a logic unit coupled to said second counter, wherein said logic unit is configured to activate a recovery action if a value of said second counter equals a threshold value.

15. The multithreaded processor as recited in claim 14, wherein said queue further comprises:
logic for setting a block bit in instructions associated with a second thread to a predetermined value.

16. The multithreaded processor as recited in claim 15, wherein said instructions with said block bit set to said predetermined value are not issued.

17. The multithreaded processor as recited in claim 14, wherein said queue further comprises:
logic for receiving a tag of a next to complete instruction for said first and said second thread; and
logic for comparing said tag with an instruction tag of every instruction in said queue.

18. The multithreaded processor as recited in claim 17, wherein if there is a match of said tag with said instruction tag of an instruction in said queue, then said queue further comprises:
logic for issuing said matched instruction if said matched instruction does not have a block bit set to said predetermined value.

19. The multithreaded processor as recited in claim 18, wherein said matched instruction is said next to complete instruction for said first thread.

20. The multithreaded processor as recited in claim 17, wherein if there is a match of said tag with said instruction tag of an instruction in said queue, then said queue further comprises:
logic for not issuing said matched instruction if said matched instruction has a block bit set to said predetermined value.

21. The multithreaded processor as recited in claim 20, wherein said matched instruction is said next to complete instruction for said second thread.

22. The multithreaded processor as recited in claim 17, wherein if there is not a match of said tag of said next to complete instruction for at least one of said first and said second thread with said instruction tag of an instruction in said queue, then said next to complete instruction for at least one of said first and said second thread is not issued.

23. A multithreaded processor, comprising:
an instruction fetch unit configured to access instructions from an instruction cache;
an instruction dispatch unit coupled to said instruction fetch unit, wherein said instruction dispatch unit is configured to decode said fetched instructions; and
a queue coupled to said instruction dispatch unit, wherein said instruction dispatch unit is further configured to dispatch one or more of said decoded instructions to said queue, wherein said queue comprises:
a first counter configured to count a number of instructions for a plurality of threads in said queue;
a second counter coupled to said first counter, wherein said second counter is configured to track a number of times of consecutive clock cycles a number of instructions for each of said plurality of threads in said queue did not all change from a previous clock cycle with respect to a current clock cycle; and
a logic unit coupled to said second counter, wherein said logic unit is configured to activate a recovery action if a value of said second counter equals a threshold value.

24. The multithreaded processor as recited in claim 23, wherein said queue further comprises:
logic for resetting said counter if said number of instructions for each of said plurality of threads in said queue all change from said previous clock cycle with respect to said current clock cycle.

25. The multithreaded processor as recited in claim 23, wherein said queue further comprises:
logic for setting a block bit in instructions associated with one of said plurality of threads to a predetermined value.

26. The multithreaded processor as recited in claim 25, wherein said instructions with said block bit set to said predetermined value are not issued.

* * * * *